United States Patent
Daniels et al.

(10) Patent No.: US 7,543,234 B2
(45) Date of Patent: Jun. 2, 2009

(54) STACKING PORTLETS IN PORTAL PAGES

(75) Inventors: Fonda J. Daniels, Cary, NC (US); David Bruce Kumhyr, Austin, TX (US); Paul Franklin McMahan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 11/173,041

(22) Filed: Jul. 1, 2005

(65) Prior Publication Data

US 2007/0006083 A1  Jan. 4, 2007

(51) Int. Cl.
*G06F 3/00* (2006.01)

(52) U.S. Cl. .................. 715/742; 715/790; 715/766; 715/767

(58) Field of Classification Search .......... 715/790, 715/742, 513, 766, 767, 802
See application file for complete search history.

(56) References Cited

U.S. PATENT DOCUMENTS

| | | | |
|---|---|---|---|
| 5,491,785 A * | 2/1996 | Robson et al. .......... 715/210 |
| 5,835,094 A * | 11/1998 | Ermel et al. ............ 715/848 |
| 6,374,237 B1 | 4/2002 | Reese .................... 707/3 |
| 6,448,956 B1 * | 9/2002 | Berman et al. .......... 345/156 |
| 6,591,261 B1 | 7/2003 | Arthurs .................. 707/2 |
| 6,613,101 B2 * | 9/2003 | Mander et al. .......... 715/273 |
| 6,658,626 B1 | 12/2003 | Aiken .................... 715/526 |
| 6,782,421 B1 | 8/2004 | Soles et al. ............. 709/223 |
| 6,829,615 B2 | 12/2004 | Schirmer et al. ........ 707/102 |
| 6,857,020 B1 | 2/2005 | Chaar et al. ............ 709/226 |
| 7,216,295 B2 * | 5/2007 | Wu et al. ................ 715/203 |
| 2002/0038228 A1 | 3/2002 | Waldorf et al. .......... 705/7 |
| 2002/0046257 A1 | 4/2002 | Killmer .................. 709/218 |
| 2002/0167538 A1 | 11/2002 | Bhetanabhotla .......... 345/700 |

(Continued)

FOREIGN PATENT DOCUMENTS

EP   112668 A2   8/2001

OTHER PUBLICATIONS

Rodriguez et al., "Adding Voice to your Portlet Applications", Jul. 23, 2004, IBM, pp. 1-142. http://www.redbooks.ibm.com/redpapers/pdfs/redp3878.pdf.

(Continued)

*Primary Examiner*—Stephen S Hong
*Assistant Examiner*—Omar Abdul-Ali
(74) *Attorney, Agent, or Firm*—Yee & Associates, P.C.; Robert E. Straight, II

(57) ABSTRACT

A portal is comprised of a plurality of portlets. Each portlet accesses hardware and software to gather data. Each portlet offers information to the portal page. Each portlet's information has a specific content type and markup. A subset of portlets are determined stackable if the subset of portlets have in common one or more of the same hardware, software, content type or markup. Once a subset of portlets is determined stackable, the user's preference for stacking the portlets is obtained by loading a user profile or asking the user. If the subset of portlets are stackable and the user desires the subset of portlets stacked, then the subset of portlets are stacked such that the stack of portlets present a first portlet and a control for selecting a second portlet from within the subset of portlets that is not currently presented.

18 Claims, 6 Drawing Sheets

U.S. PATENT DOCUMENTS

| | | | |
|---|---|---|---|
| 2002/0173997 A1 | 11/2002 | Menard et al. | 705/7 |
| 2003/0187967 A1 | 10/2003 | Walsh et al. | 709/223 |
| 2003/0197735 A1 | 10/2003 | Woltzen | 345/777 |
| 2004/0034553 A1 | 2/2004 | Cole et al. | 705/7 |
| 2004/0158799 A1 | 8/2004 | Breuel | 715/513 |
| 2004/0189707 A1 | 9/2004 | Moore et al. | 345/777 |
| 2004/0230557 A1* | 11/2004 | Bales et al. | 707/1 |
| 2004/0254851 A1* | 12/2004 | Himeno et al. | 705/26 |
| 2005/0015716 A1 | 1/2005 | Lavoie et al. | 715/511 |
| 2005/0034553 A1 | 2/2005 | Kamen et al. | 74/491 |
| 2005/0049924 A1 | 3/2005 | DeBettencourt et al. | 705/21 |
| 2005/0055634 A1* | 3/2005 | Burns et al. | 715/517 |
| 2005/0065913 A1* | 3/2005 | Lillie et al. | 707/3 |
| 2006/0004913 A1* | 1/2006 | Chong | 709/217 |
| 2006/0031851 A1* | 2/2006 | Laird et al. | 719/320 |
| 2006/0129935 A1* | 6/2006 | Deinlein et al. | 715/733 |
| 2007/0214449 A1* | 9/2007 | Choi et al. | 717/100 |

OTHER PUBLICATIONS

Rokosz et al., "Computer-Implemented Method, System and Program Product for Analyzing a Collaborative Space", DOSS # LOT920030053.

Velasquez et al., "Combining the web content and usage mining to understand the visitor behavior in a website", Third IEEE International Conference on Data Mining, ISBN: 0 7695 1978 4, 2003, pp. 669-672.

* cited by examiner

STACKING PORTLETS IN PORTAL PAGES

BACKGROUND OF THE INVENTION

1. Field of the Invention

The present invention relates generally to graphical user interface (GUI). Still more particularly the present invention relates to an improved method, apparatus, and computer usable code for customizing portal pages.

2. Description of the Related Art

A portal displays information aggregated from different sources. The information is customized for a specific user and is dynamically updated. The user interacts with the portal by specifying what information is displayed and how it is displayed. A user may customize a portal by specifying the user's preferences so that each time the user accesses the portal, the portal checks the user's preferences and displays the information that the user wants in the form in which the user wants the information to be displayed. The user may also vary which information is displayed or how it is displayed by interacting with the portal in real-time in addition to using user preferences.

For example, a user can specify which publicly traded companies the user is interested in and the portal may display stock quotes and recent news items about those companies. Because each user may be interested in different companies, each user's portal displays only what that user wants to see and in the way the user wants to see it. A portal may also be used to monitor a computer network by monitoring the status of different network resources.

Each time a user preference is added, the portlet(s) associated with that preference are added to the portal. Thus, customization of a portal page may result in many portlets being crowded into the portal page, which may result in a cluttered portal that makes it difficult for the user to view all the portlets clearly.

BRIEF SUMMARY OF THE INVENTION

The present invention provides a method, apparatus, and computer useable code for displaying information from a plurality of portlets. A portal is comprised of a plurality of portlets. Each portlet accesses hardware and software to gather data. Each portlet offers information to the portal page. Each portlet's information has a specific content type and markup. A subset of portlets is determined stackable if the subset of portlets has in common one or more of the same hardware, software, content type, or markup. Once a subset of portlets is determined stackable, the user's preference for stacking the portlets is obtained by loading a user profile or asking the user. If the subset of portlets is stackable and the user desires the subset of portlets stacked, then the subset of portlets is stacked such that the stack of portlets presents a first portlet and a control for selecting a second portlet from within the subset of portlets that is not currently presented.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
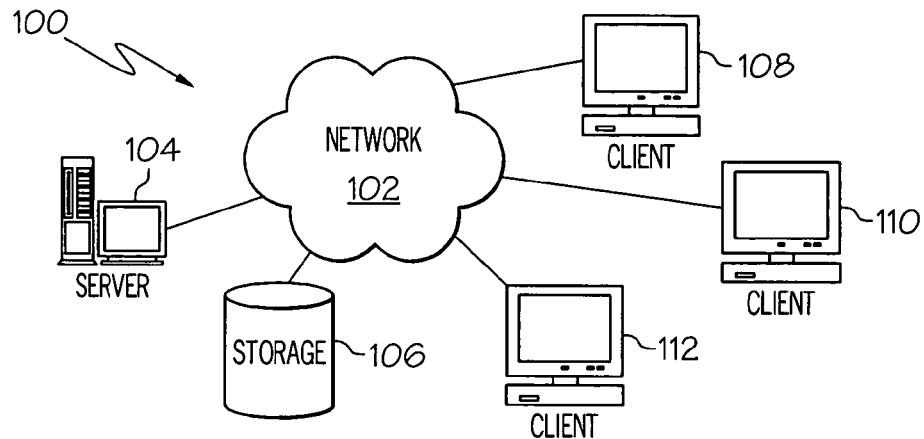
FIG. 1 depicts a pictorial representation of a network of data processing systems in which aspects of the present invention may be implemented.
Figure 2:
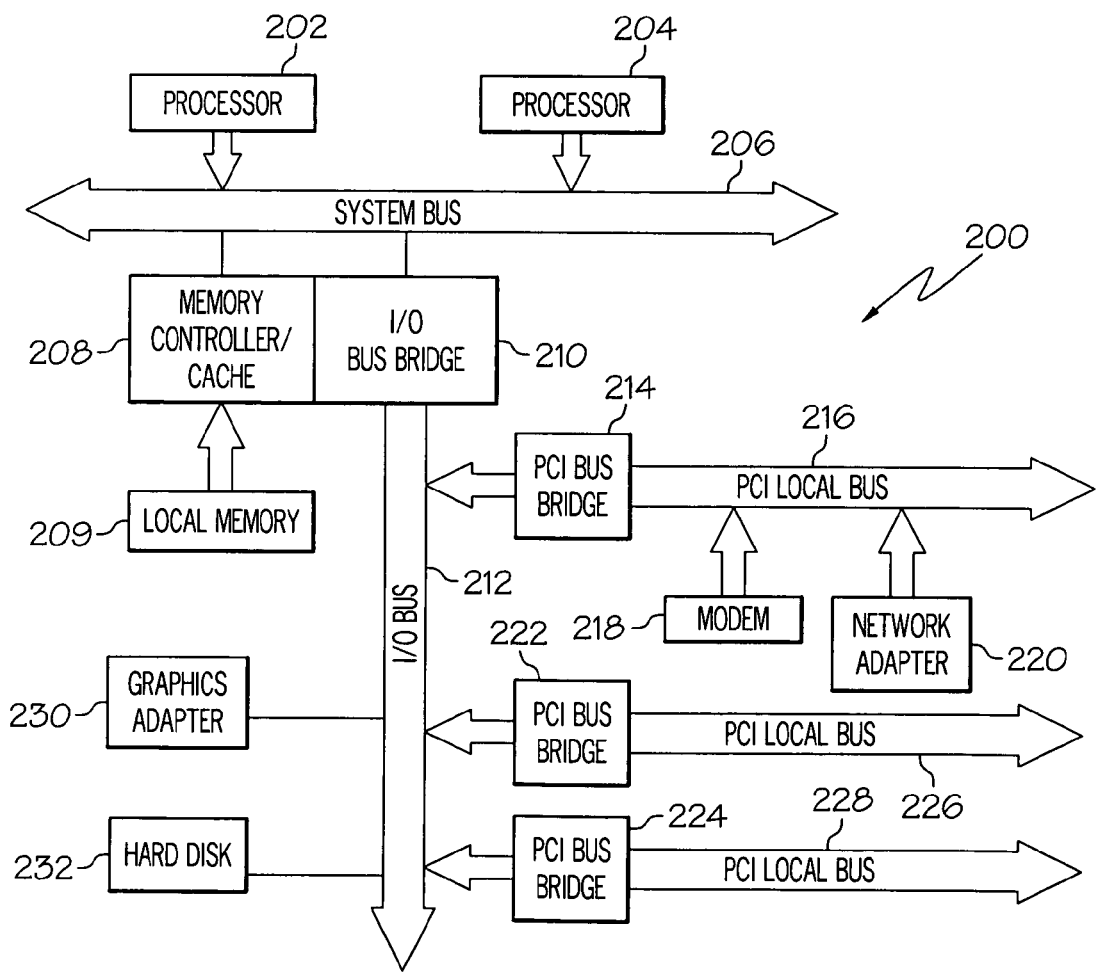
FIG. 2 is a block diagram of a data processing system that may be implemented as a server in accordance with an illustrative embodiment of the present invention.

FIGS. 1 and 2 are provided as exemplary diagrams of data processing environments in which embodiments of the present invention may be implemented. It should be appreciated that FIGS. 1 and 2 are only exemplary and are not intended to assert or imply any limitation with regard to the environments in which aspects or embodiments of the present invention may be implemented. Many modifications to the depicted environments may be made without departing from the spirit and scope of the present invention.

Typically, a user sends a request to a portal page generator to create a portal. The request to create a portal may involve accessing a specific web page, logging on to a specific web page, or other means. Typically, each portal is customized to a specific user's requirements. A given portal displays information aggregated from different sources and the information is dynamically updated while the portal is being generated. Each source may be hosted by a different web server.

If the user's identity is sent with the request to generate the portal page, then a user profile may be loaded and the portal generated based on information in the user's profile. The user's identity may be determined by asking the user to login, a cookie placed on the user's computer or other means.

If there is no user profile then a default profile may be used. The user may specify what information is displayed and how it is displayed and these preferences may be stored in the user's profile, so that each time the user accesses the portal, the portal loads the user's profile and displays the appropriate information in the appropriate form. The user may also vary which information is displayed or how it is displayed by interacting with the portal in real-time in addition to specifying that information in a user profile.

For example, if a user specifies which publicly traded companies the user is interested in, then the portal will display stock quotes and recent news items about those companies. Because each user may be interested in different companies, each user's portal displays only what that user wants to see and in the way the user wants to see it. A portal may also be used to monitor a computer network by monitoring the status of different network resources.

Typically, each piece of information displayed on a portal page is created by a portlet. The portlet accesses specific software processes or hardware to gather information. The portlet then takes the gathered information, and displays it on the portal page using a markup language user interface component.

Each time a user requests additional information be displayed on the portal page the portlet(s) associated with that information are added to the portal. Thus, customization of a portal page may result in many portlets being crowded into the portal page, which may result in a cluttered portal that makes it difficult for the user to view all the portlets clearly.

This invention provides an improved method, apparatus, and computer useable code for organizing the portlets as the number of portlets displayed increases to prevent the portal from becoming crowded.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 connects to network 102 along with storage unit 106. In addition, clients 108, 110, and 112 connect to network 102. These clients 108, 110, and 112 may be, for example, personal computers or network computers. In the depicted example, server 104 may be a web server that providers portal pages and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Referring to FIG. 2, a block diagram of a data processing system that may be implemented as a server, such as server 104 in FIG. 1, is depicted in accordance with an illustrative embodiment of the present invention. Data processing system 200 may be asymmetric multiprocessor (SMP) system including a plurality of processors 202 and 204 that connect to system bus 206. Alternatively, a single processor system may be employed. Also connected to system bus 206 is memory controller/cache 208, which provides an interface to local memory 209. I/O bus bridge 210 connects to system bus 206 and provides an interface to I/O bus 212. Memory controller/cache 208 and I/O bus bridge 210 may be integrated as depicted.

Peripheral component interconnect (PCI) bus bridge 214 connects to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both).

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the present invention may be applied to a multiprocessor data processing system.

Figure 3:
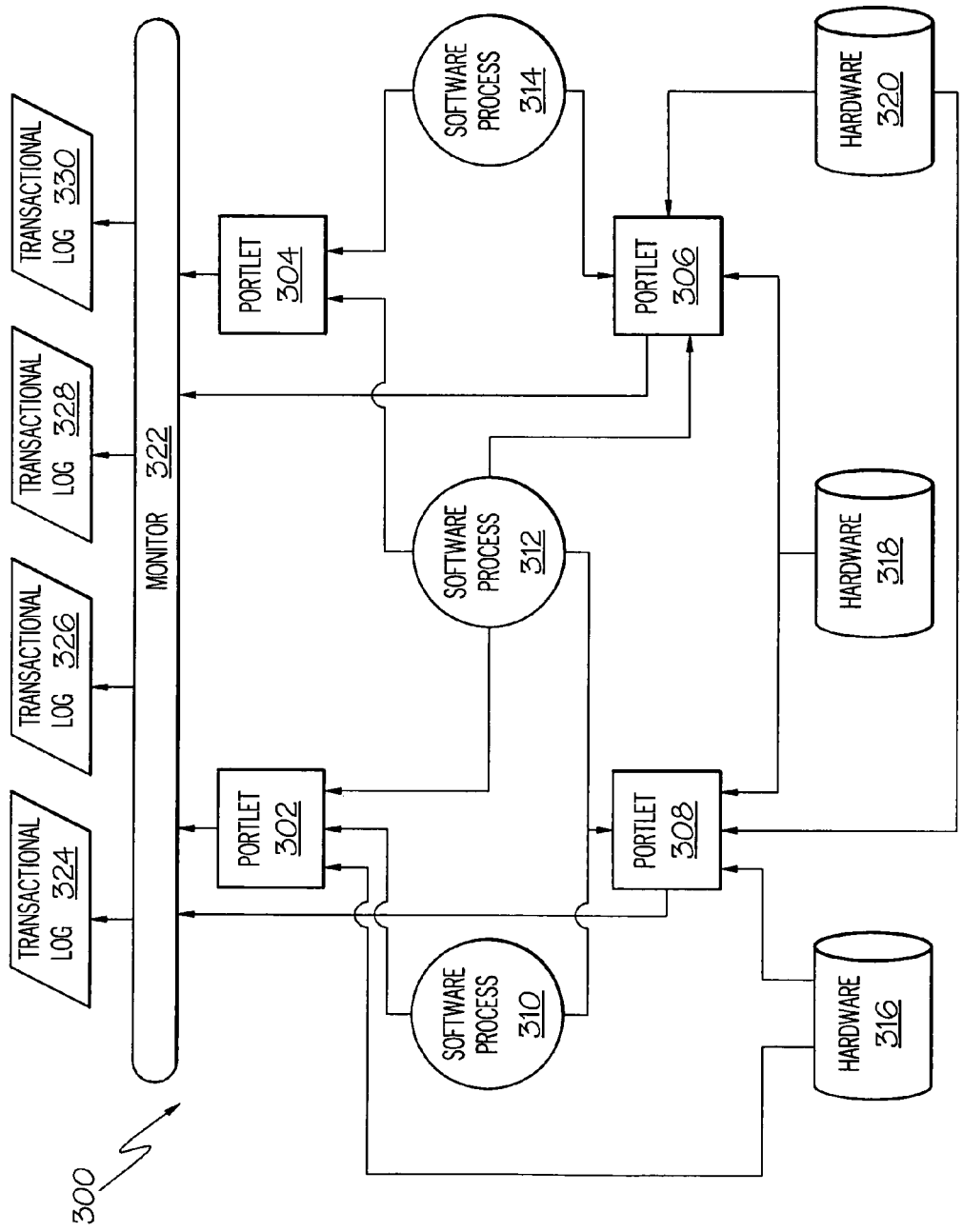
FIG. 3 is a block diagram of portlets monitoring software processes and hardware in accordance with an embodiment of the present invention.

Referring to FIG. 3, the reference numeral 300 generally designates a block diagram showing portlets monitoring one or more resources in accordance with an embodiment of the present invention. A resource may be a software process, a hardware subsystem, or a similar network resource.

FIG. 3 comprises portlets 302, 304, 306, and 308, software processes 310, 312, and 314, hardware 316, 318, and 320, monitor 322, and transactional logs 324, 326, 328, and 330. The software processes and hardware may reside anywhere in the computer network. The number of portlets, software processes, and hardware shown are purely for purposes of illustration and are not meant to imply architectural limitations with respect to the invention.

In this example, portlet 302 accesses hardware 316, software process 310 and software process 312. Portlet 304 accesses software process 312 and software process 314. Portlet 306 accesses software process 312, software process 314, hardware 318, and hardware 320. Portlet 308 accesses software process 310, software process 312, hardware resource 316, hardware resource 318 and hardware resource 320.

Monitor 322 monitors portlets 302, 304, 306, and 308 and produces a transactional log for each portlet. Thus, transactional log 324 corresponds to portlet 302, transactional log 326 corresponds to portlet 304, transactional log 328 corresponds to portlet 306, and transactional log 330 corresponds to portlet 308.

Transactional logs 324, 326, 328 and 330 each contain information about the resources, such as software processes and hardware that each portlet accesses to gather data. By comparing transactional logs, an application such as a portal page generator can determine whether two or more portlets are accessing the same resources or the same type of resources. Portlets that access the same resources or same type of resources are considered stackable and may be stacked based on the user's preferences. Note that additional items, such as content and markup, may also be looked at when determining whether two or more portlets are stackable.

Any characteristic of a portlet, such as the resource monitored or the output display may be used to compare two or more portlets to determine if they are stackable.

For example, portlet 302 and portlet 308 both access resources 310, 312, and 316 and can be stacked if a stackable portlet requires three or more common characteristics. If two or more common characteristics are required, portlet 304 and portlet 306 both monitor 312 and 314, and therefore, may be stackable. If only one common characteristic is required, 302, 304, 306, and 308 may be stackable because 312 is common. See Table 1.

TABLE 1

| Number in common | Common Software Process or Hardware | Stackable Portlets |
| --- | --- | --- |
| 1 | 312 | 302, 304, 306, 308 |
| 2 | 312, 314 | 304 and 306 |
| 3 | 310, 312, 316 | 302 and 308 |
| 3 | 312, 318, 320 | 306 and 308 |

The rules for when to stack may be based on how many characteristics the portlets have in common. Two or more portlets are stackable if they have sufficient elements in common, where sufficient is predefined by a user. When two or more portlets are determined to be stackable, the user may be asked whether the user wishes to stack the portlets or the portal may automatically stack the portlets based on rules pre-defined by the user. For example, two or more portlets may be stacked only if they access at least two common elements or only if at least 50% of each portlet's accessed elements are common. Any graphical user interface capable of displaying portlets, such as a portal, may be used.

Figure 4:
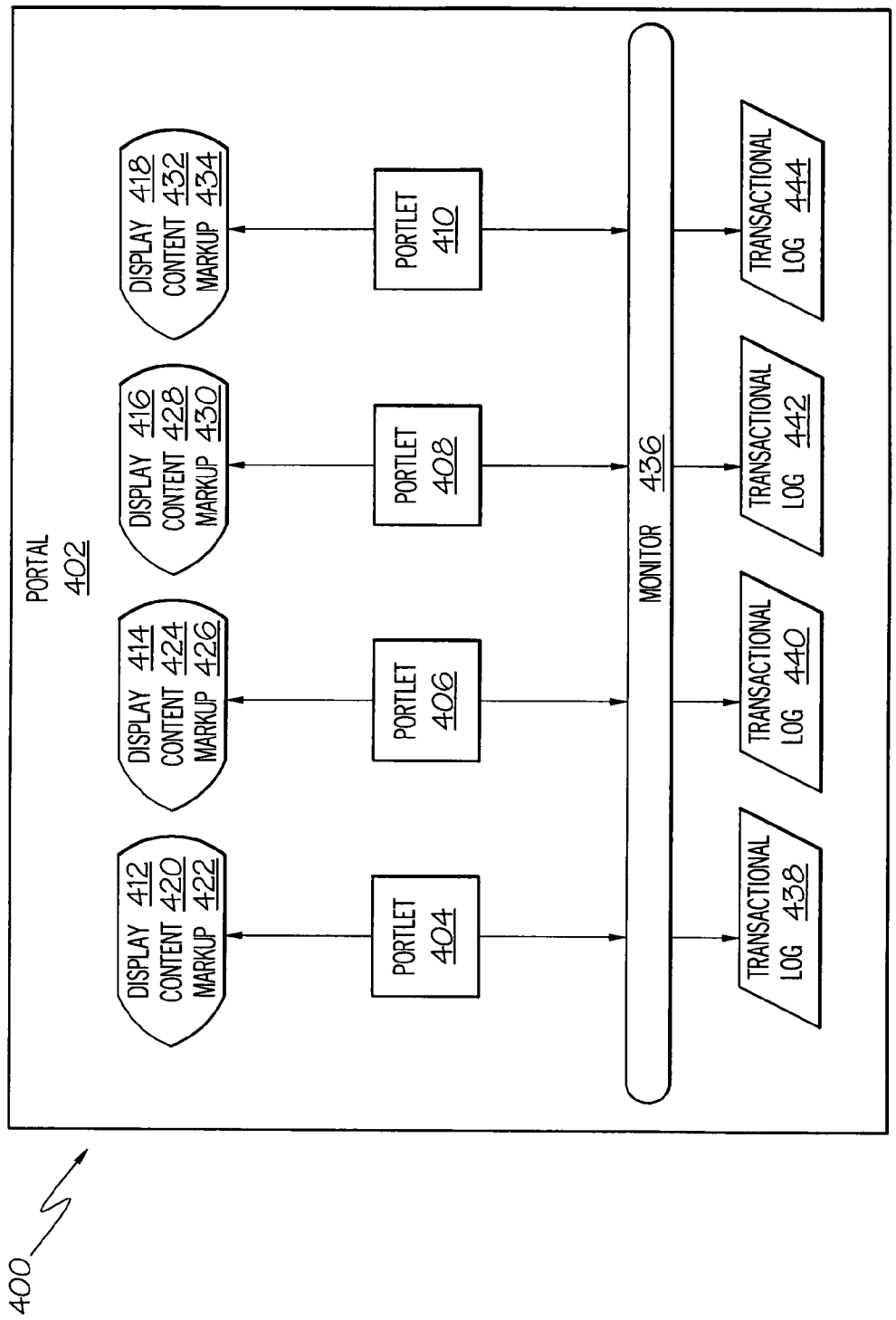
FIG. 4 is a block diagram of a portal with portlets in accordance with an embodiment of the present invention.

Referring to FIG. 4, numeral 400 generally designates a block diagram showing a portal with portlets in accordance with an embodiment of the present invention.

Portal 402 comprises portlet 404, 406, 408, and 410. Portlet 404 outputs to display 412, portlet 406 outputs to display 414, portlet 408 outputs to display 416, and portlet 410 outputs to display 418. Display 412 comprises content 420 and markup 422, display 414 comprises content 424 and markup 426, display 416 comprises content 428 and markup 430, and display 418 comprises content 432 and markup 434.

Monitor 436 monitors portlets 404, 406, 408, and 410 and produces a transactional log for each portlet. Thus, transactional log 438 corresponds to portlet 404, transactional log 440 corresponds to portlet 406, transactional log 442 corresponds to portlet 408, and transactional log 444 corresponds to portlet 410. Each transactional log contains information as to which elements, hardware and software processes, for example, that each portlet accesses.

FIG. 4 depicts an example of the portlets prior to stacking. Portal 402 compares the common characteristics of a portal, such as the transactional log, content and markup of each portlet, to determine if there is sufficient commonality between two or more portlets to consider the portlets stackable. For example, to determine if portlets 404 and 406 are stackable, portal 402 may look at transaction logs 438 and 440, contents 420 and 424, and markups 422 and 426. If portal 402 finds portlets 404 and 406 access common resources or display common content or markup, then portal 402 may consider portlets 404 and 406 stackable.

Figure 5:
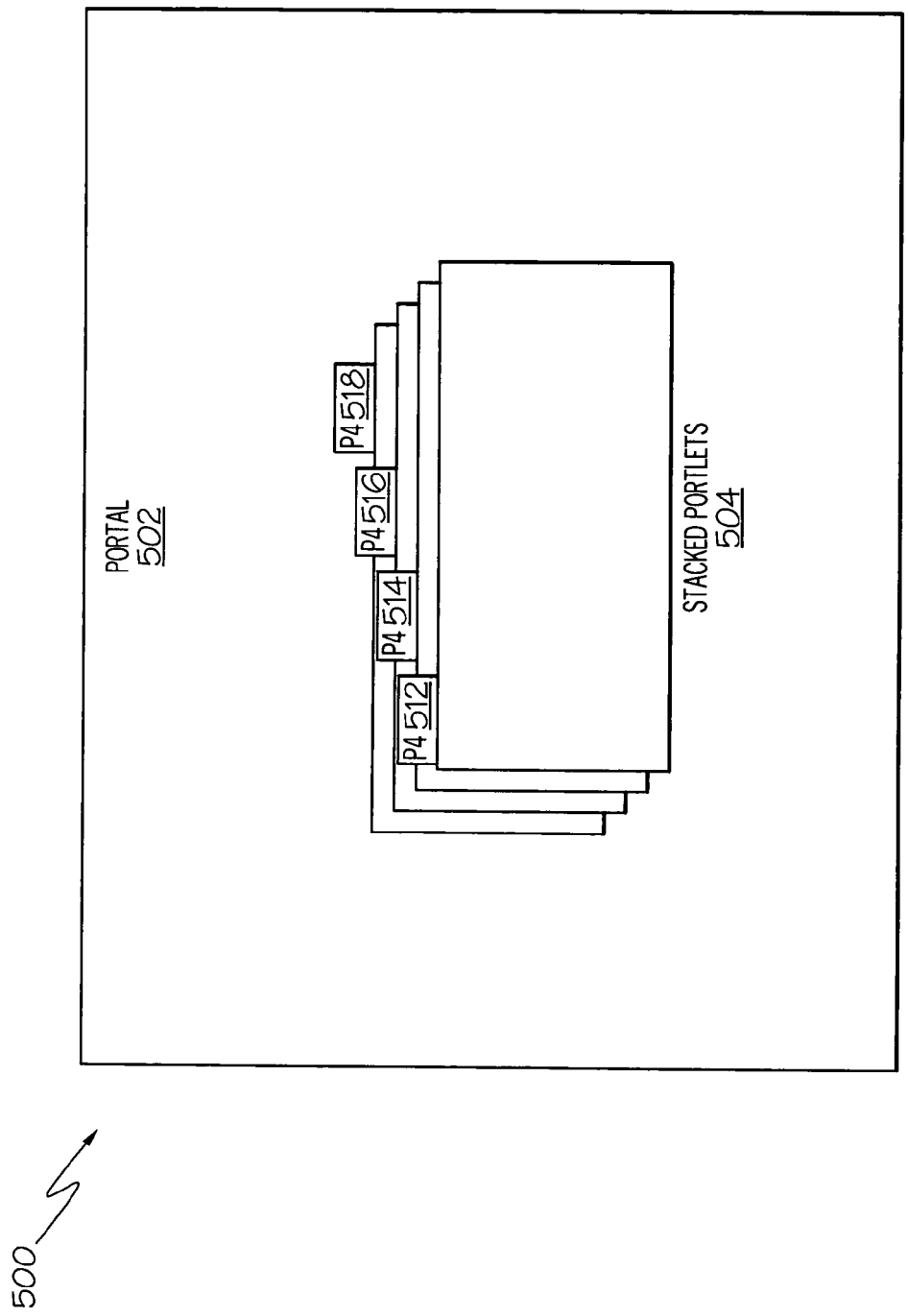
FIG. 5 is a block diagram of a portal with stacked portlets in accordance with an embodiment of the present invention.

Referring to FIG. 5, numeral 500 generally designates a block diagram showing a portal with stacked portlets in accordance with an embodiment of the present invention. Portal 502 comprises stacked portlet 504. Stacked portlet 504 comprises portlets 512, 514, 516 and 518.

FIG. 5 is an example of how, once two or more portlets have been determined to be stackable and the user has allowed them to be stacked, the portal displays stacked portlets. In this example, portlets 512, 514, 516, and 518 have been determined stackable because they access common resources or because they display common content or markup.

Two or more portlets typically occupy less space when stacked than they do when displayed individually, thereby reducing portlet clutter. The user may toggle between the individual portlets that comprise a specific stacked portlet by using tabs, forward and back buttons, cascading, scroll bars, or any other similar stacking and selection method.

For example, multiple scroll bars may be used to navigate a set of stacked portlets, with each scroll bar navigating a different set of portlet characteristics. A vertical scroll bar could allow the user to go lower or higher in the hierarchy of a set of portlets while the horizontal scroll bar could allow the user to navigate between portlets at the same level in the hierarchy. For example, the vertical scroll bar could select between viewing a stock index like the Dow Jones Industrial Average (DJIA) to viewing an individual stock that is a component of the DJIA, while the horizontal scroll bar could select which stock index (DJIA, Standard and Poors 500, etc.) or which individual stock to view, depending on the setting of the vertical scroll bar.

This technique may be used, for example, to present an entire portal as a stack of portlets so that one given portlet is presented on top of the stack at a given time. This would be useful, for example, when presenting a portal on a device with limited screen real estate such as a smartphone or personal digital assistant (PDA).

This technique may also be used, for example, to take a large number of portlets and present more than one portlet, with the control selecting another set of portlets not currently presented. For example, forty portlets could be stacked with five portlets presented, and the control selecting five portlets not presented.

Figure 6:
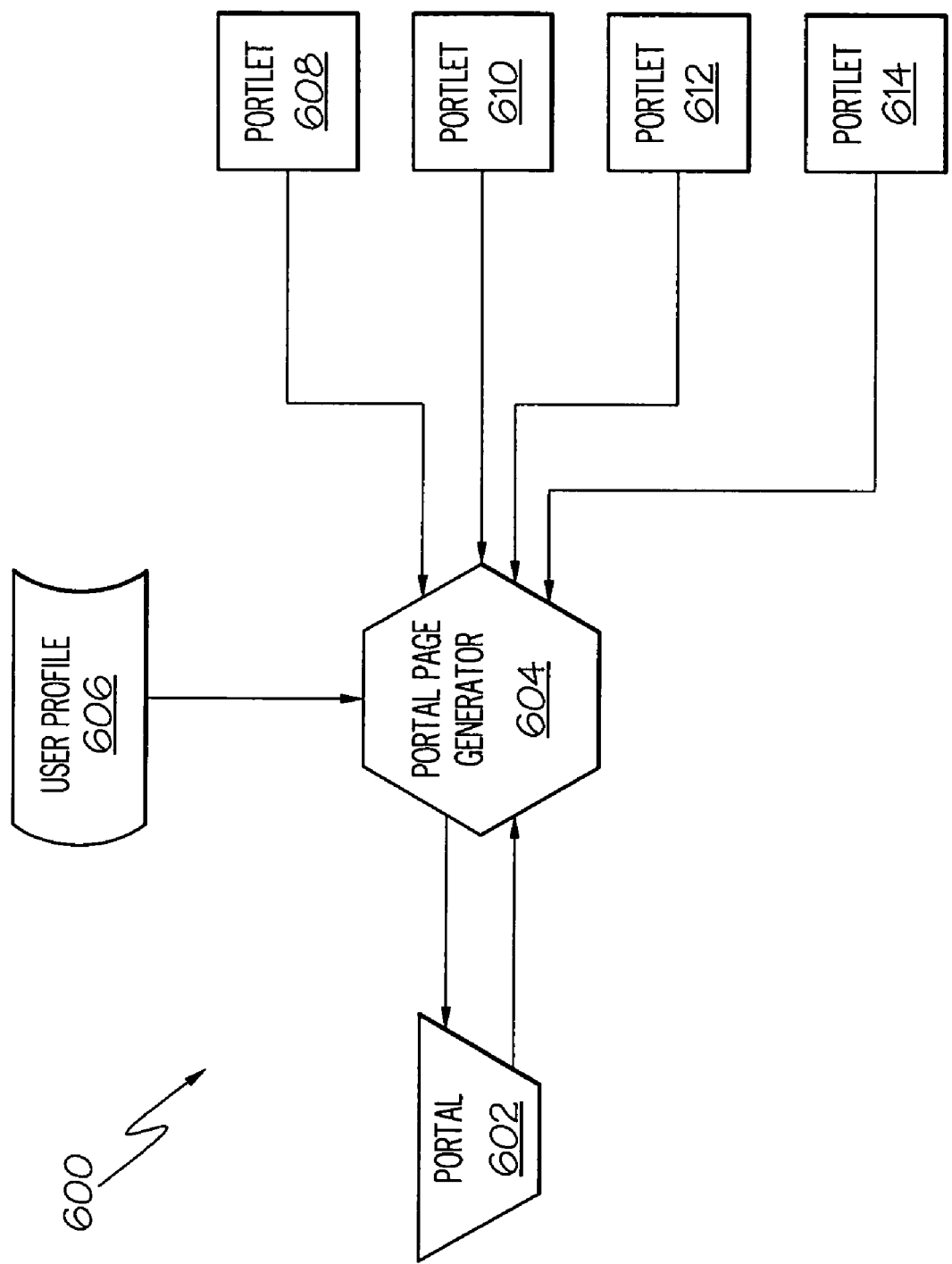
FIG. 6 is a block diagram of a portal architecture in accordance with an embodiment of the present invention.

Referring to FIG. 6, the reference numeral 600 generally designates a block diagram showing a portal architecture in accordance with an embodiment of the present invention. FIG. 6 illustrates portal 602, portal page generator 604, user preferences 606, and portlets 608, 610, 612, and 614.

Portal page generator 604 is a server application that dynamically generates a portal page comprised of portlets. The portal page may be generated using Java or other language. The portal page may contain a markup language such as hypertext markup language (HTML) or extensible markup language (XML). The portal page generator may be an active server page generator, for example.

When a user requests a portal page, portal page generator 604 may receive information about the client's identity. If portal page generator 604 receives the user's identity, portal page generator 604 then loads user profile 606. The user's identity may be obtained through the use of a cookie, asking the user to login, or other similar means. If portal page generator 604 does not receive the identity of the user, user profile 606 may be a default set of user preferences. Once portal page generator 604 has the user's preferences, portal page generator 604 activates the portlets required to display the information for those user preferences.

In this example portlets 608, 610, 612, and 614 are required to display the information for portal 602 based on user profile 606. Based on user profile 606, portal page generator 604 can determine if any of portlets 608, 610, 612 and 614 are stackable. That is, portal page generator 604 may examine the software processes and hardware that portlets 608, 610, 612 and 614 access, as well as the content and markup of each portelet's respective display, and determine which portlets have sufficient commonality to be stackable. Portal page generator 604 may then ask the client whether to stack the portlets. Alternatively, portal page generator 604 may automatically stack the portlets without prompting the user. The portlets might automatically be stacked because that is the default setting or because portal page generator 604 knows that the portal is being displayed on a screen with very little real estate, such as that of a PDA.

Figure 7:
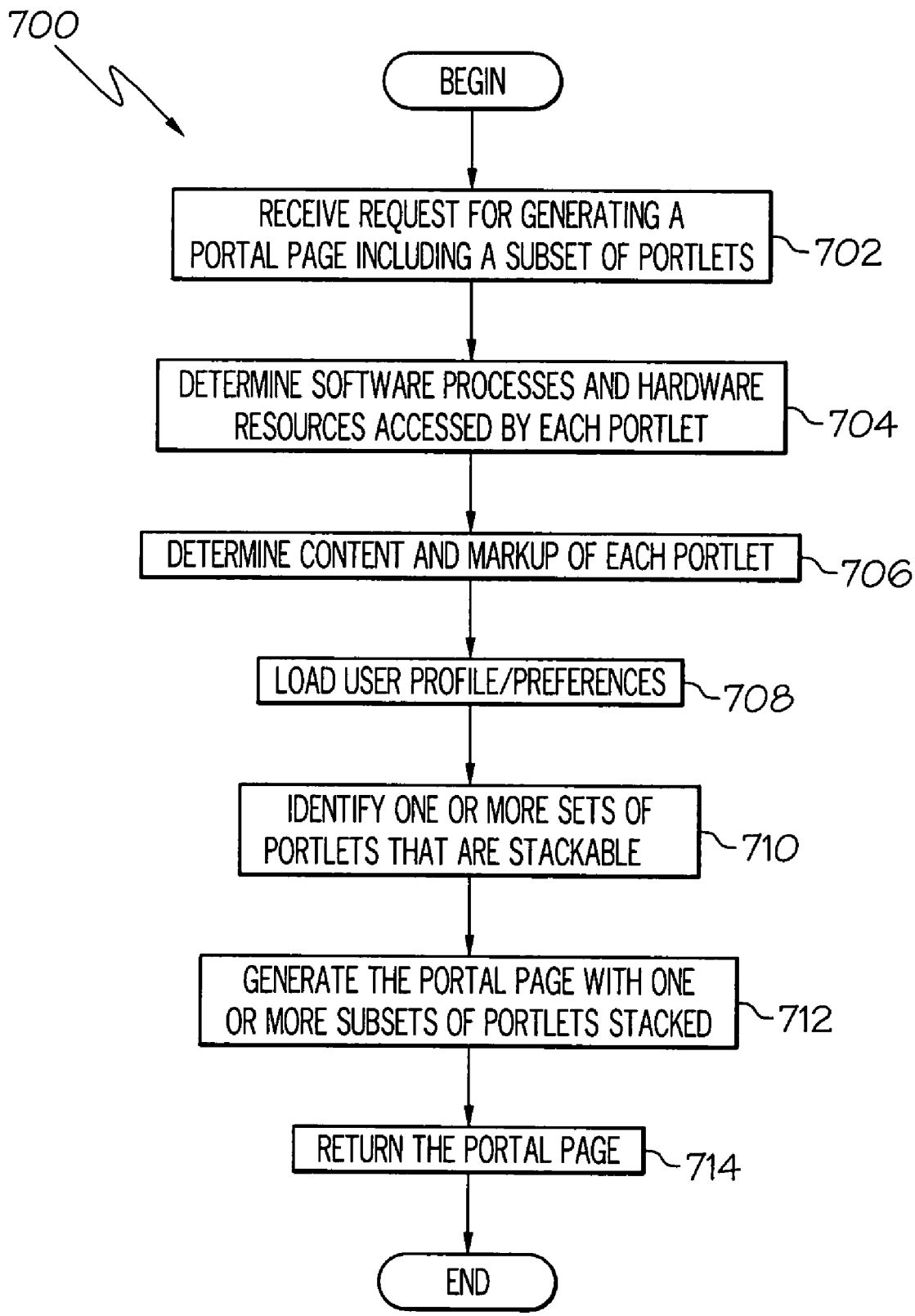
FIG. 7 depicts a flowchart illustrating how portlets are stacked in accordance with an embodiment of the present invention.

Referring to FIG. 7, the reference numeral 700 generally designates a flowchart illustrating how portlets are stacked in accordance with an embodiment of the present invention. Operation begins when a portal page generator receives a request to generate a portal page including a plurality of portlets in block 702. The software and hardware resources each portlet accesses is determined in block 704. The content and markup of the information each portlet displays is determined in block 706. The user's profile/preferences are obtained in block 708. The user's profile/preferences may be obtained, for example, by loading the user's profile or asking the user. A commonality in a subset of portlets is identified in block 710, and, based on the commonality, which portlets are stackable. Based on which portlets have been identified as stackable, the portal is generated with one or more subsets of portlets stacked in block 712. Finally, the portal page is returned in block 714, and operation ends.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of generating a portal page, wherein the portal page includes a plurality of includes a plurality or portlets, the method comprising:
   determining whether a subset of portlets is stackable; and
   responsive to the subset of portlets being stackable, identifying two or more stacks of portlets that are stackable, and generating the portal page such that the two or more stacks of portlets are generated as a stack of stacks, wherein the stack of stacks presents a first stack of portlets and a control for selecting a second stack of portlets from within the two or more stacks of portlets that is not currently presented.

2. The method of claim 1, wherein determining whether the subset of portlets is stackable includes:
   examining software processes and hardware resources each portlet accesses; and
   identifying at least one software process or hardware resource common to the subset of portlets.

3. The method of claim 1, wherein determining whether the subset of portlets is stackable includes:
   examining content elements and markup elements each portlet displays; and
   identifying at least one content element or markup element common to the subset of portlets.

4. The method of claim 1, wherein determining whether the subset of portlets is stackable includes:
   obtaining a user's preference for stacking portlets by loading a user profile, wherein the subset of portlets is determined to be stackable based on the user's preference.

5. The method of claim 1, wherein determining whether the plurality of portlets is stackable includes:
   obtaining a user's preference for stacking portlets by querying the user, wherein the subset of portlets is determined to be stackable based on the user's preference.

6. The method of claim 1, wherein the control is a tab, a scroll bar, a button, or a link.

7. An apparatus comprising:
   a processor connected to a memory storing instructions that when executed by the processor provide for:
   a plurality of portlet generators, wherein each portlet generator generates a portlet; and
   a portal page generator, wherein the portal page generator receives a client request for a portal page that includes a subset of portlets, examines the subset of portlets, identifies at least one commonality in the subset of portlets, determines whether the subset of portlets is stackable, and, responsive to the subset of portlets being stackable, identifies two or more stacks of portlets that are stackable, and generating the portal page such that the two or more stacks of portlets are generated as a stack of stacks, wherein the stack of stacks presents a first stack of portlets and a control for selecting a second stack of portlets from within the two or more stacks of portlets that is not currently presented.

8. The apparatus of claim 7, wherein the portal page generator determines whether the subset of portlets is stackable by examining software processes and hardware resources each portlet accesses, and identifying at least one software process or hardware resource common to the subset of portlets.

9. The apparatus of claim 7, wherein the portal page generator determines whether the subset of portlets is stackable by examining content elements and markup elements each portlet displays, and identifying at least one content element or markup element common to the subset of portlets.

10. The apparatus of claim 7, wherein the portal page generator determines whether the plurality of portlets is stackable by obtaining a user's preference for stacking portlets by loading a user profile, wherein the subset of portlets is determined to be stackable based on the user's preference.

11. The apparatus of claim 7, wherein the portal page generator determines whether the plurality of portlets is stackable by obtaining a user's preference for stacking portlets by querying the user wherein the subset of portlets is determined to be stackable based on the user's preference.

12. The apparatus of claim 7, wherein the control is a tab, a scroll bar, a button, or a link.

13. A computer program product for generating a portal page, wherein the portal page includes a plurality of portlets, said computer program including:
    a computer usable medium including computer usable program code stored thereon, the computer usable program code comprising:
    computer usable program code for determining whether a subset of portlets is stackable; and
    computer usable code responsive to the subset of portlets being stackable, for identifying two or more stacks of portlets that are stackable, and generating the portal page such that the two or more stacks of portlets are generated as a stack of stacks, wherein the stack of stacks presents a first stack of portlets and a control for selecting a second stack of portlets from within the two or more stacks of portlets that is not currently presented.

14. The computer program product of claim 13, wherein the computer usable program code for determining whether the subset of portlets is stackable includes:
    computer usable program code for examining software processes and hardware resources each portlet accesses; and
    computer usable program code for identifying at least one software process or hardware resource common to the subset of portlets.

15. The computer program product of claim 13, wherein the computer usable program code for determining whether the subset of portlets is stackable includes:
    computer usable program code for examining content elements and markup elements each portlet displays; and
    computer usable program code for identifying at least one content element or markup element common to the subset of portlets.

16. The computer program product of claim 13, wherein the computer usable program code for determining whether the subset of portlets is stackable includes:
    computer usable program code for obtaining a user's preference for stacking portlets by loading a user profile, wherein the subset of portlets is determined to be stackable based on the user's preference.

17. The computer program product of claim 13, wherein the computer usable program code for determining whether the subset of portlets is stackable includes:
    computer usable program code for obtaining a user's preference for stacking portlets by querying the user, wherein the subset of portlets is determined to be stackable based on the user's preference.

18. The computer program product of claim 13, wherein the control is a tab, a scroll bar, a button, or a link.

* * * * *